United States Patent [19]

Roush

[11] Patent Number: 4,982,483

[45] Date of Patent: Jan. 8, 1991

[54] VALVE SEAT TOOL FOR REMOVING AND INSERTING VALUE SEATS

[75] Inventor: Walter T. Roush, Houston, Tex.

[73] Assignee: Keystone International Inc., Houston, Tex.

[21] Appl. No.: 443,321

[22] Filed: Nov. 30, 1989

[51] Int. Cl.[5] .......... B23P 19/02

[52] U.S. Cl. .......... 29/213.1; 29/267; 29/280

[58] Field of Search .......... 29/280, 267, 213 R, 29/282, 213.1; 254/25, 21, 131; 81/58.2, DIG. 5

[56] References Cited

U.S. PATENT DOCUMENTS

| | | | |
|---|---|---|---|
| 1,422,121 | 7/1922 | Millen | 81/58.2 |
| 2,276,303 | 3/1942 | Herrig | 29/280 |
| 2,339,210 | 1/1944 | Volz | 81/DIG. 5 |
| 2,471,557 | 5/1949 | Bishop | 29/280 |
| 3,063,148 | 11/1962 | Brilmyer | 29/267 |
| 3,447,228 | 6/1969 | Knickerbocker | 29/267 |
| 3,978,573 | 9/1976 | Williams | 29/267 |
| 4,494,290 | 1/1985 | Rutledge | 29/280 |
| 4,649,618 | 3/1987 | Harrison | 29/267 |

*Primary Examiner*—Robert C. Watson

*Attorney, Agent, or Firm*—Dodge Bush & Moseley

[57] ABSTRACT

A valve seat tool (46) and method for removing and inserting a tubular frusto-conical seat (26) from the seat cavity (22) of a valve chamber (20) in a valve body (12). The tool (46) has a laterally extending protuberance (60) on its inner end adapted to be received within a port (38) of the seat (26) for prying the seat (26) loose upon a prying action of the tool (46). An annular shoulder (56) on the tool (10) engages the outer annular surface (42) of the seat (26) for providing a pivot axis.

6 Claims, 2 Drawing Sheets

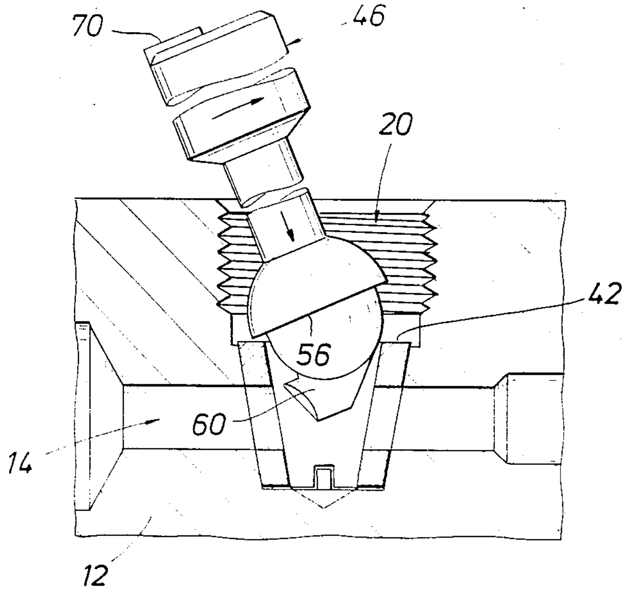
FIG. 5
FIG. 6
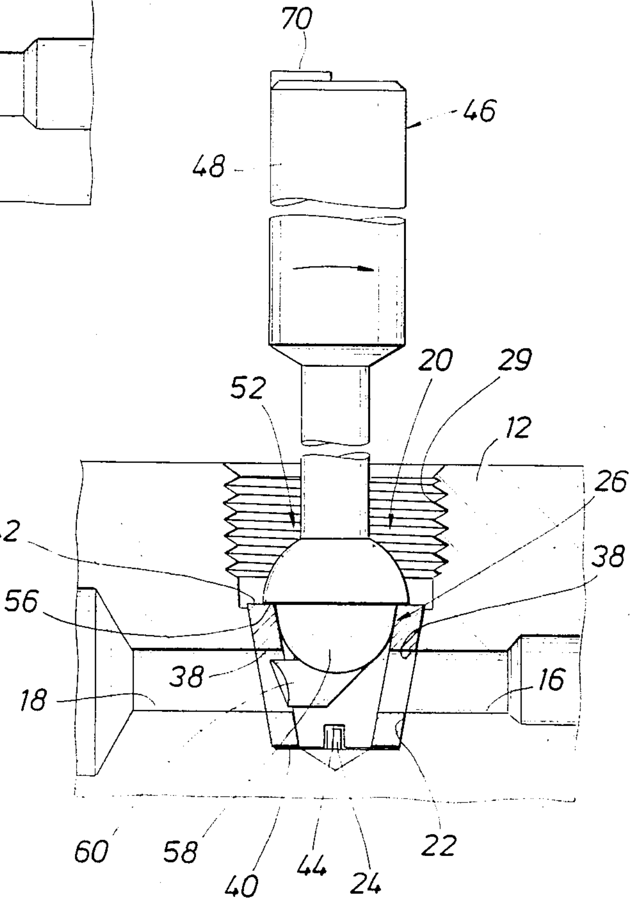
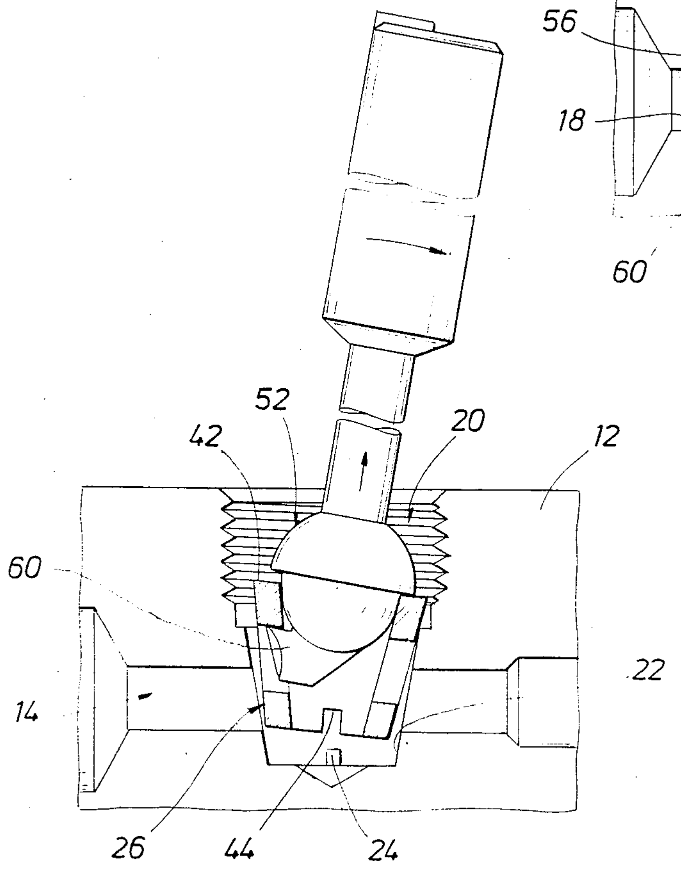
FIG. 7

VALVE SEAT TOOL FOR REMOVING AND INSERTING VALUE SEATS

BACKGROUND OF THE INVENTION

This invention relates to a valve seat tool and method for removing and inserting valve seats, and more particularly to such a tool which is adapted to engage the valve seat for removal and insertion thereof, upon removal of the associated valve member from the valve body.

Heretofore, particularly for hand operated valves having a straight through flow passage, a valve seat having a pair of axially aligned ports therein for alignment with the flow passage has been provided and receives a valve member for blocking fluid flow through the flow passage.

The valve member may be a tapered plug member, for example, which is movable upon rotation of a valve stem between an extended position blocking fluid flow through the flow passage and a retracted position permitting fluid flow through the flow passage. The valve seat or seat insert is preferably of a frusto-conical shape formed of a soft non-metallic material such as a resilient plastic material, for example, or formed of a metallic material, such as stainless steel, for example.

The seat is normally mounted within a cavity in a valve body with a press friction fit and to remove the seat for repair or replacement, a punch or screw driver has been inserted within the flow passage from an end port or bonnet opening for prying the seat from its cavity. When the seat "snaps" free, the punch or rod may strike and damage the valve body portion about the flow passage at the seat.

Also, since the punch or screw driver is inserted within the flow passage which may be relatively long and of a relatively small diameter, it may be difficult under certain conditions to obtain sufficient leverage for prying the valve seat loose.

SUMMARY OF PRESENT INVENTION

The present invention is directed to a valve seat tool for removal and insertion of a valve seat from the valve chamber of the valve body after removal of the valve member from the chamber. One valve with which the tool comprising the present invention is particularly adapted for use is a hand operated valve having a straight through flow passage with the valve seat being inserted within the valve chamber with ports therein in axial alignment with the flow passage. The valve seat receives the valve member in its closed position for blocking fluid flow through the flow passage.

The seat removal tool is inserted within the valve body chamber after removal of the valve member and associated bonnet from the valve body and has a protuberance on its inner end which is adapted to be inserted within a port of the valve seat. After insertion of the protuberance within the valve seat port, the tool is rocked or pivoted in a plane parallel to the longitudinal axis of the flow passage to snap the valve seat from its seat cavity within the valve chamber of the body. Upon unseating of the valve seat, the valve seat is lifted by the tool from the valve chamber. A visual indicator on the outer end of the tool extends in the direction of the protuberance for alignment of the protuberance with a valve seat port.

For insertion of the initial or replacement seat within the seat cavity of the valve chamber, a port in the seat is first engaged by the protuberance on the end of the tool for initial positioning of the seat within the seat cavity over an alignment pin within the cavity, and then a shoulder on the tool adjacent the protuberance engages the upper annular end surface of the seat for pressing the seat in place upon a downward force exerted by the tool.

It is an object of this invention to provide a method and tool for removing and inserting valve seats in a valve chamber upon removal of the associated valve member from the valve body.

It is a further objection of this invention to provide such a method and tool particularly adapted for the removal and insertion of a seat having a pair of ports therein for axial alignment with a straight through flow passage in the valve body.

Other objects, features and advantages of the invention will become more apparent after referring to the following specification and drawings.

BRIEF DESCRIPTION OF THE DRAWINGS

FIG. 5 is a fragmentary sectional view of a valve body showing a seat in the valve bodY chamber and the valve seat tool of this invention extending within the valve chamber immediately prior to engagement with the seat;

FIG. 6 is a fragmentary sectional view of the valve body similar to FIG. 5 but showing a shoulder of the tool engaging the upper annular surface of the seat for pressing the seat into inserted position within the valve chamber; and FIG. 7 is a fragmentary sectional view of the valve body similar to FIGS. 5 and 6 but showing the tool in engagement with the seat and removing the seat from the valve chamber.

DESCRIPTION OF THE INVENTION

Figure 1:
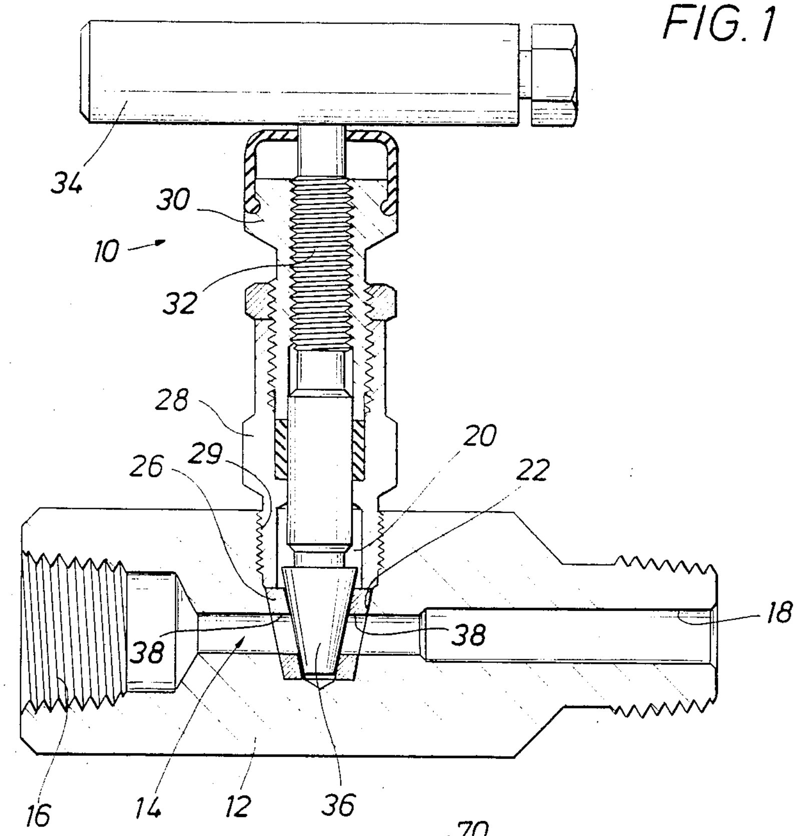
FIG. 1 is a sectional view of a hand operated valve with which the valve seat tool of the present invention is particularly adapted with use and having a seat with a pair of ports therein in axial alignment with a straight through flow passage in the valve body.
Figure 2:
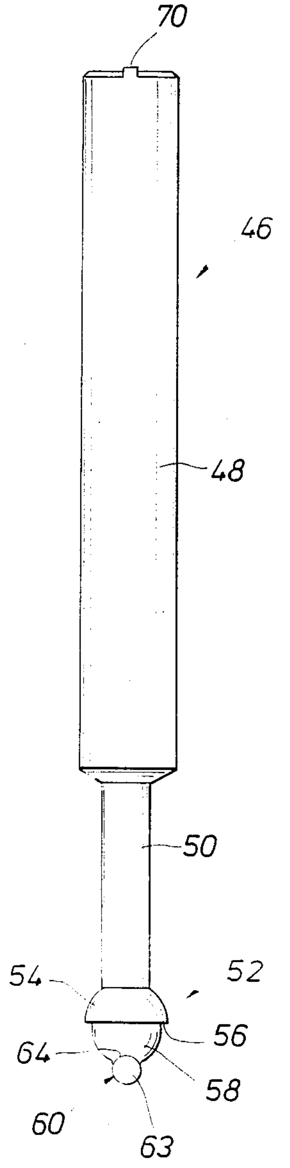
FIG. 2 is a front elevation of the tool of the present invention adapted for use with the valve shown in FIG. 1.

Referring now to the drawings for a better understanding of this invention, and more particularly to FIG. 1, a so-called hand valve is indicated generally at 10 as an example of a type of valve with which the present invention may be utilized. Valve 10 includes a valve body 12 having a straight through flow passage 14 therein including an outlet portion 16 and inlet portion 18. A valve chamber is generally indicated at 20 (see also FIGS. 5-7) and includes a seat pocket or seat cavity 22 therein. An alignment pin 24 extends from the bottom of seat cavity 22 for alignment of a valve seat generally indicated at 26 as will be explained further below.

An externally threaded valve bonnet is shown at 28 and is threaded within internal screw threads 29 of valve chamber 20. An externally threaded bushing 30 is threaded within the outer end of bonnet 28. An externally threaded valve stem 32 is threaded within bushing 30 and has a handle 34 on the outer end. A tapered valve member 36 is mounted on the inner end of stem 32 and is adapted to be received within valve seat 26 for blocking fluid flow through flow passage 14 in a closed position as shown in FIG. 1. Upon rotation of handle 34, frusto-conically-shaped valve member 36 is moved to the seated position as shown in FIG. 1 and upon rotation of handle 34 in an opposite direction, tapered plug 36 is moved to a retracted open position removed from seat 26 to permit fluid flow through flow passage 14.

Seat 26 is of a generally frusto-conical tubular shape and has a pair of opposed ports 38 therein in axial alignment with flow passage 14 when valve seat 26 is in installed position as shown particularly in FIGS. 1 and 6. Seat 26 has a lower annular surface shown at 40 and an upper outer annular surface shown at 42. For alignment of ports 38 with flow passage 14, a notch or slot 44 is provided in lower annular surface 40 to receive alignment pin 24 for the accurate positioning of valve seat 26 within valve cavity 22.

Referring now to FIGS. 2-5, the valve seat tool of the present invention is indicated generally at 46. Tool 46 includes an elongate body having an outer handle 48 adapted to be gripped manually, and a small diameter body portion 50 at the inner end of handle 48. A seat actuator shown generally at 52 is secured to the inner or lower end of small diameter body portion 50. Seat actuator 52 includes an annular skirt 54 defining an annular shoulder or flange 56 at its inner end. A generally bulbous hemispherical end portion shown at 58 is integral with skirt 54 and a generally lateral extending protuberance or extension is shown at 60 projecting from hemispherical end portion 58 in a generally lateral direction substantially at right angles to the longitudinal axis of tool 46.

Figure 3:
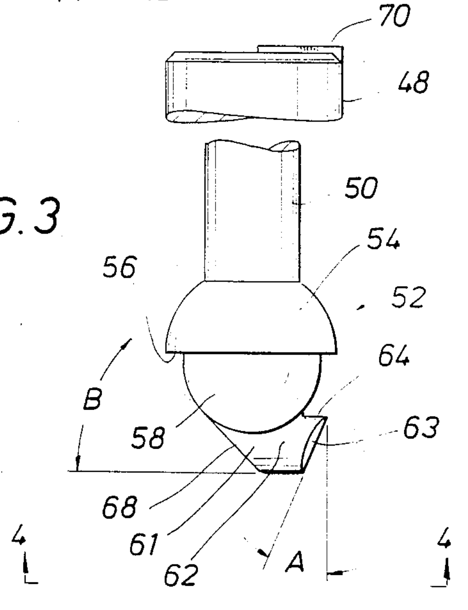
FIG. 3 is a partial side elevation of the valve seat tool shown in FIG. 2 and illustrating the protuberance on the inner end of the tool for fitting within a port of the seat to be removed.
Figure 4:
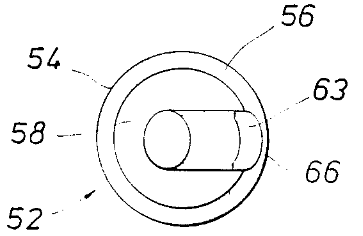
FIG. 4 is an end elevational view of the valve seat tool shown in FIG. 3 taken generally along the line 4—4 of FIG. 3.

Protuberance 60 extends from bulbous hemispherical portion 58 in a continuation of the outer surface of portion 58 and curves laterally therefrom to form an arcuate elbow portion 61 and a shank 62 having an end face 63. Shank 62 is of a generally circular cross-section and end face 63 tapers inwardly from its outer or upper arcuate surface 64 at an angle A of around twenty-five (25) degrees as shown in FIG. 3 with respect to the longitudinal axis of tool 46. Additionally, face 63 is formed of a radius as shown particularly in FIG. 4 at 66. A rear surface 68 of elbow portion 61 opposite face 63 extends at an angle B of around forty-five (45) degrees with respect to the longitudinal axis of tool 46 and forms a generally smooth continuation of the adjacent surface of hemispherical portion 58.

Hemispherical or bulbous portion 58 is of a size sufficient to fit within the outer end of valve seat 26 as shown particularly in FIG. 6 with annular shoulder 56 engaging the upper annular surface 42 of valve seat 26 and protuberance 60 fitting within a seat port 38. For alignment of protuberance 60 with a seat port 38, a visually observable indicator 70 is provided on the outer end of handle 48 and extends in the same direction as shank 62 thereby to permit protuberance 60 to be accurately aligned with a desired port 38 with upper annular surface 64 of shank 62 adapted to engage the annular seat surface defining port 38. While indicator 70 is shown as a projection, a notch may be utilized as an indicator, if desired.

In operation, and referring to FIGS. 5-7, the method utilized by valve seat tool 46 for the insertion and removal of seat 26 is illustrated. For removal of seat 26, bonnet 28 along with tapered valve member 36 and bushing 30 are removed from valve body 12 by unthreading of bonnet 28. Valve chamber 20 is then open exposing valve seat 26 for removal by tool 46. First, as shown in FIG. 5, tool 46 is inserted within chamber 20 with protuberance 60 aligned with a selected valve port 38 and indicator 70 indicating the accurate alignment of protuberance 60. Shoulder 56 is seated on upper annular surface 42 of valve seat 26 as shown in FIG. 6 with hemispherical portion 58 being received within valve seat 26. Handle 48 is then pivoted in a direction parallel to the longitudinal axis of flow passage 14 with shoulder 56 acting as a pivot axis as shown in FIG. 7 for the pivoting of protuberance 60 so that upper annular surface 64 of shank 62 thereof engages the adjacent surface defining port 38 for prying seat 26 loose from seat cavity 22. Seat 26 is then lifted from valve body 12 by outer or upward movement of handle 48.

For installation of a valve seat 26, the procedure is reversed with seat 26 being positioned on tool 46 and protuberance 60 engaged with a seat port 38. Indicator 70 is utilized for positioning notch or slot 44 in alignment with pin 24. After slot 44 is in alignment with pin 24, a downward force on handle 48 forces annular shoulder 56 against upper annular surface 42 about seat 26 to force seat 26 into the seat cavity 22 of valve chamber 20. Then, tool 46 is pivoted in an arcuate direction opposite the direction for the removal of seat 26 to remove protuberance 60 from port 38 as shown in FIG. 5. In this position, tool 46 may be lifted from valve chamber 20 and bonnet 28, along with valve stem 32 and valve member 36, may then be threaded within valve body 12.

As previously indicated, valve seat 26 may be a so-called soft seat formed of a plastic or elastomeric material, for example, to provide a bubble type seal. However, it may be desirable under certain conditions to form seat 26 of a metal construction, such as for use with particular ladings, for example.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. For removal of a frusto-conical tubular valve seat from a seat cavity in an open valve chamber of a valve body with the seat having a pair of opposed ports in axial alignment with a straight flow passage extending through the valve body, the tubular seat having an open outer end and adapted to receive a tapered plug valve member in closed position for blocking fluid flow through said ports and flow passage; an improved seat removal tool comprising:

an elongate body having a handle on an outer end portion thereof for gripping manually by an operator and a seat actuator on an opposed inner end portion thereof;

said seat actuator including a generally laterally extending protuberance on its inner end, an integral hemispherically shaped bulbous portion adjacent the laterally extending protuberance being in axial alignment with the longitudinal axis of the elongate body, and an inwardly facing annular shoulder about the hemispherically shaped portions, said protuberance projecting laterally outwardly from said hemispherically shaped bulbous portion;

said hemispherically shaped portion adapted to be inserted within said open outer end of said frusto-conical tubular valve seat with said protuberance inserted within a port of said valve seat and said annular shoulder engaging the outer annular surface of the tubular valve seat whereby upon the manual exertion of a pivotal force against said handle in a plane aligned with the longitudinal axis of the flow passage the protuberance engages the seat surface defining the port and the shoulder forms a pivotal axis for the tool to pry the seat loose from its seat cavity within the valve chamber.

2. The improved seat removal tool as set forth in claim 1 wherein a visually observable indicator mark is positioned on said tool to indicate the direction of lateral extension of said protuberance from the longitudinal axis of the tool thereby to permit alignment of said protuberance with a port in said seat.

3. The improved seat removal tool as set forth in claim 1 wherein said laterally extending protuberance has an upper arcuate surface for engaging the seat surface defining the port and an outer face tapering inwardly from said upper annular surface.

4. The improved seat removal tool as set forth in claim 1 wherein said protuberance has a laterally projecting end for fitting within said port of said valve seat and a rear surface opposite said projecting end forming a generally smooth continuation of the adjacent surface of said hemispherically shaped portion.

5. The improved seat removal tool as set forth in claim 4 wherein said laterally projecting end of said protuberance has an arcuate face and said rear surface extends at an angle of around forty five degrees with respect to the longitudinal axis of said tool.

6. The improved seat removal tool as set forth in claim 1 wherein said tool is adapted for installing said valve seat in said seat cavity with said hemispherically shaped portion received within the open end of said frusto-conical valve seat and said annular shoulder engaging the upper annular surface of the seat for pressing said seat inwardly for installation.

* * * * *